May 21, 1968  A. WINKLER ET AL  3,384,863
PHOTOGRAPHIC FLASH UNIT
Filed Sept. 21, 1966
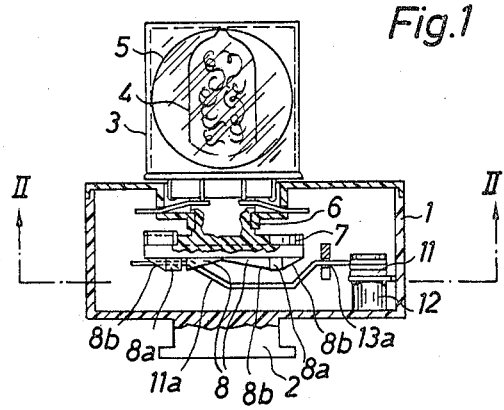
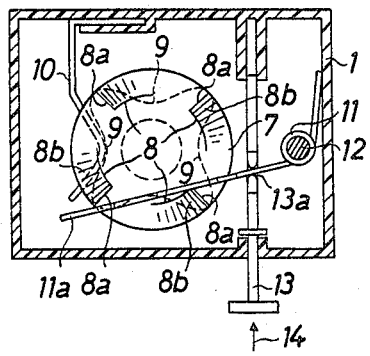
INVENTORS
ALFRED WINKLER
KARL BAMMESBERGER
BY ERWIN FISCHER United States Patent Office 3,384,863
Patented May 21, 1968

3,384,863
PHOTOGRAPHIC FLASH UNIT
Alfred Winkler, Munich, Karl Bammesberger, Munich-Untermenzing, and Erwin Fischer, Munich, Germany, assignors to Agfa-Gevaert Aktiengesellschaft, Leverkusen, Germany
Filed Sept. 21, 1966, Ser. No. 580,982
Claims priority, application Germany, Sept. 22, 1965,
A 24,436
10 Claims. (Cl. 339—147)

ABSTRACT OF THE DISCLOSURE

A flash unit wherein the housing accommodates a socket which can be coupled with a multiple flash bulb container. The socket is rotatable with the container to place the flash bulbs into an optimum position for illumination of the subject. The means for rotating the socket comprises a torsion spring which can be deformed by a manually operated member to overcome the resistance of an indexing spring for the socket and to abruptly propel the socket from one of a series of predetermined positions to the next position.

---

The present invention relates to flash units for photographic cameras. More particularly, the invention relates to improvements in flash units of the type which may utilize so-called "Flashcubes" or analogous containers or carriers for two or more flash lamps.

It is an important object of the present invention to provide a flash unit which can be produced and mounted in a simple way at low cost.

Another object of the invention is to provide a very simple advance mechanism for the multiple flash container which is connected to the flash unit.

A further object of the invention is to provide a flash unit with a simple indexing mechanism.

An additional object of the invention is to provide a flush unit which is of very compact, sturdy design. A further important object of the invention is to provide a flash unit with a rapidly rotatable socket.

Still another object of the invention is to provide a flash unit which enables the user of the camera on which the flash unit is mounted to take pictures without flash and without necessitating removal of the flash unit.

A concomitant object of the invention is to provide a flash unit which allows rotation of the container by hand without damage to the unit.

With these objects in view, the invention is embodied in a flash unit for use on photographic cameras, comprising housing means for at least one electrical component of the flash circuit, socket means rotatably supported by the housing for movement between predetermined positions and adapted to receive a portion of a multiple flash light container so that such container can rotate with the socket means, spring means supported by the housing means for applying pressure to the socket means to rotate it abruptly from one predetermined position to the next predetermined position, and a manually operated member for operating the spring means.

The novel features which are considered as characteristic of the invention are set forth in particular in the appended claims. The improved flash unit itself, however, both as to its construction and its mode of operation, together with additional features and advantages thereof, will be best understood upon perusal of the following detailed description of a specific embodiment with reference to the accompanying drawings, in which:

FIG. 1 is a vertical section through the flash unit and
FIG. 2 is a section substantially as seen in the direction of arrows from the line II—II of FIG. 1.

Referring to the drawings, there is shown a housing 1 with a foot 2 adapted to be inserted into the accessory shoe of a camera not shown. The top wall of the housing 1 is provided with a rotatably positioned socket 6 for a multiple flash light container 3. Behind each of the lateral faces of the container 3 there are provided a flash bulb 4 and a reflector 5. The electrical parts, such as battery and capacitor, can be fitted in the housing 1. The connection between the electrical parts of the flash unit and the synchronization contact in the camera can be made either by a central contact between the accessory foot and the accessory shoe or by cable.

The rotatable socket 6 which in this case is designed for a multiple flash container 3 holding four flash bulbs arranged at 90° angles with respect to one another, includes a disk 7 with four cams 8 which show a sharp edge 8a on one side and a bevel 8b on the other side. In the socket 6 are further provided four recesses 9 which serve as step-notches. A laminated indexing spring 10, hooked to the housing 1, always engages a recess 9 in a position of the socket 6 in which a flash bulb 4 faces the object to be photographed. Wound around a pin 12 there is a spring 11, which braces with one arm against housing 1. The other arm 11a is positioned in a slot 13a of a manually operated member 13, the end of said arm resting behind the edge 8a of a cam 8.

If the manually operated member 13 is depressed in the direction of arrow 14, the socket 6 cannot rotate for the time being, because the indexing spring 10, engaging a recess 9, opposes such action. Therefore the arm 11a is caused to store energy. When a certain degree of tension has been reached, the bias of the arm 11a is greater than the retaining power of indexing spring 10 so that the arm 11a turns or propels the socket 6 clockwise thereby overcoming the resistance of indexing spring 10. After a rotation by 90° the indexing spring 10 will enter into the next recess 9. The socket 6 is caused to turn suddenly. Upon release of the manually operated member 13 the same is being returned by means of the arm 11a which is still slightly under tension, opposite to the direction of arrow 14. At the same time the arm 11a slides over the bevel 8b behind edge 8a of the next cam 8.

However, the multiple flash light container 3 can also be rotated manually without actuating the manually operated member 13. The foot of the container 3 then turns the socket 6 whereby the arm 11a of the spring 11 simply rides over the bevels 8b. Thus it is possible to quickly turn into exposure position a flash bulb not yet ignited on a multiple flash light container with several flash bulbs already used.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. A flash unit for use on photographic cameras, comprising housing means for at least one electrical component of the flash circuit; socket means rotatably supported by said housing means for movement between successive predetermined positions and adapted to receive a portion of a multiple flash light container so that said container can rotate with said socket means; spring means supported by said housing means, said spring means being deformable to thereby apply to said socket means a pressure so as to propel said socket means abruptly from one predetermined position to the next predetermined position; and a manually operated member for deforming said spring means.

2. A flash unit as defined in claim 1, further comprising resilient means normally opposing rotation of said socket means with a force which is overcome by said spring means when the latter stores a predetermined amount of energy in response to deformation by said member.

3. A flash unit as defined in claim 1, wherein said member is reciprocable in said housing against the opposition of and under the bias of said spring means.

4. A flash unit as defined in claim 1, wherein said spring means comprise a torsion spring.

5. A flash unit as defined in claim 1, wherein said spring means is in uninterrupted contact with said socket means.

6. A flash unit for use on photographic cameras, comprising housing means for at least one electrical component of the flash circuit; socket means rotatably supported by said housing means for movement between predetermined positions and adapted to receive a portion of a multiple flash light container so that said container can rotate with said socket means; indexing spring means provided on said housing means for yieldably holding said socket means in predetermined positions; second spring means supported by said housing means for rotating the socket means; cam means provided on said socket means; and a manually operated member for moving said second spring means against said cam means to tension said second spring means sufficiently to overcome said indexing means and to rotate said socket means abruptly by way of said cam means.

7. A flash unit as set forth in claim 6, wherein said cam means comprises a plurality of cams each of which comprises an edge for receiving pressure from said second spring means and a bevel permitting said second spring means to slide back without rotation of said socket.

8. A flash unit as set forth in claim 6, wherein said second spring means comprises a spring with two arms, one of said arms being positioned in a slot of said manually operated member and being movable against said cam means.

9. A flash unit as set forth in claim 6, wherein said socket means has a number of recesses for said indexing spring means, the number of said recesses being equal to the number of said predetermined positions.

10. A flash unit as set forth in claim 9, wherein said indexing spring means is a laminated spring having a first end fixed to said housing means and a second end engaging one of said recesses.

References Cited
UNITED STATES PATENTS

| | | | |
|---|---|---|---|
| 1,593,985 | 7/1926 | Nielsen | 339—46 |
| 2,485,014 | 10/1949 | Prager. | |
| 2,881,685 | 4/1959 | Wagner | 67—31 X |
| 2,985,748 | 5/1961 | Mendelsohn | 240—1.3 |
| 3,312,086 | 4/1967 | Casebeer et al. | 240—1.3 X |
| 3,319,547 | 5/1967 | Parsons et al. | 240—1.3 X |

RICHARD E. MOORE, *Primary Examiner.*